(12) United States Patent
Honda (10) Patent No.: US 8,312,247 B2
(45) Date of Patent: Nov. 13, 2012

(54) PLURAL-PARTITIONED TYPE NONVOLATILE STORAGE DEVICE AND SYSTEM

(75) Inventor: Toshiyuki Honda, Kyoto (JP)

(73) Assignee: Panasonic Corporation, Osaka (JP)

( * ) Notice: Subject to any disclaimer, the term of this patent is extended or adjusted under 35 U.S.C. 154(b) by 83 days.

(21) Appl. No.: 12/999,459

(22) PCT Filed: Jun. 17, 2009

(86) PCT No.: PCT/JP2009/002753
§ 371 (c)(1),
(2), (4) Date: Dec. 16, 2010

(87) PCT Pub. No.: WO2009/153982
PCT Pub. Date: Dec. 23, 2009

(65) Prior Publication Data
US 2011/0107018 A1    May 5, 2011

(30) Foreign Application Priority Data

Jun. 20, 2008  (JP) .................................. 2008-161779

(51) Int. Cl.
*G06F 12/00* (2006.01)
(52) U.S. Cl. ........ 711/173; 711/103; 711/151; 711/156; 711/158; 711/221; 365/185.33
(58) Field of Classification Search .................. 711/173, 711/103, 151, 156, 158, 221; 365/185.33
See application file for complete search history.

(56) References Cited

U.S. PATENT DOCUMENTS

| | | | |
|---|---|---|---|
| 7,111,121 B2 | 9/2006 | Oishi et al. | |
| 7,159,075 B2 | 1/2007 | Moro | |
| 7,305,534 B2 * | 12/2007 | Watt et al. | 711/163 |
| 7,454,568 B2 | 11/2008 | Moro | |
| 8,190,919 B2 * | 5/2012 | Natarajan et al. | 713/193 |

(Continued)

FOREIGN PATENT DOCUMENTS

JP   2004-54896   2/2004

(Continued)

OTHER PUBLICATIONS

International Search Report issued Jul. 21, 2009 in International (PCT) Application No. PCT/JP2009/002753.

(Continued)

*Primary Examiner* — Stephen Elmore
(74) *Attorney, Agent, or Firm* — Wenderoth, Lind & Ponack, L.L.P.

(57) ABSTRACT

A plural-partitioned type nonvolatile storage device which solves the problem that a memory card composed of a flash memory and a controller, when a storage area is divided into a plurality of partitions, cannot be correctly used with a conventional host apparatus incapable of recognizing plural partitions. The memory card includes, as its storage areas, a device characteristic data storage area, a division table storage area, and a device storage area, where the device storage area is partitioned into plural partitions. The memory card can have different modes for adapting different accesses from the external host, and allows the external host to access partitions corresponding to the mode. Division information as to a dividing method for the plural partitions, and access information as to the host-accessible partitions corresponding to each individual mode are stored in the division table storage area. Plural types of device characteristic data corresponding to mode, respectively, are stored in the device characteristic data storage area.

15 Claims, 6 Drawing Sheets

| DIVISION NUMBER | COMPATIBLE VERSION | DATA TYPE | ACCESS METHOD | CAPACITY | CORRESPONDING INTERNAL ADDRESS RANGE | SINGLE MODE NUMBER | BOOT FLAG |
|---|---|---|---|---|---|---|---|
| 1 | 1 | USER | ADDRESS | 2G BYTES | — | 1 | 0 |
| 2 | 2 | USER | ADDRESS | 8G BYTES | — | 0 | 0 |
| 3 | 1 | CODE | ADDRESS | 64K BYTES | — | 2 | 0 |
| 4 | 1 | BOOT | SEQUENTIAL | 1K BYTES | — | 3 | 1 |

201 202 203 204 205 206 207 208

U.S. PATENT DOCUMENTS

| | | |
|---|---|---|
| 2003/0225971 A1 | 12/2003 | Oishi et al. |
| 2004/0107316 A1 | 6/2004 | Moro |
| 2005/0154819 A1 | 7/2005 | Conley et al. |
| 2006/0097061 A1 | 5/2006 | Moro |
| 2006/0200629 A1 | 9/2006 | Oishi et al. |
| 2007/0043924 A1 | 2/2007 | Ito et al. |
| 2007/0174549 A1* | 7/2007 | Gyl et al. .................. 711/115 |
| 2007/0255901 A1 | 11/2007 | Maeda et al. |
| 2008/0046997 A1* | 2/2008 | Wang .......................... 726/16 |
| 2008/0109662 A1* | 5/2008 | Natarajan et al. ............. 713/193 |
| 2008/0147964 A1* | 6/2008 | Chow et al. ................... 711/103 |
| 2010/0131695 A1* | 5/2010 | Gyl et al. ..................... 711/103 |

FOREIGN PATENT DOCUMENTS

| | | |
|---|---|---|
| JP | 2004-86505 | 3/2004 |
| JP | 2006-40264 | 2/2006 |
| JP | 2007-518188 | 7/2007 |

OTHER PUBLICATIONS

International Preliminary Report on Patentability issued Feb. 17, 2011 in International (PCT) Application No. PCT/JP2009/002753.

* cited by examiner

*Fig.2*

| DIVISION NUMBER 201 | COMPATIBLE VERSION 202 | DATA TYPE 203 | ACCESS METHOD 204 | CAPACITY 205 | CORRESPONDING INTERNAL ADDRESS RANGE 206 | SINGLE MODE NUMBER 207 | BOOT FLAG 208 |
|---|---|---|---|---|---|---|---|
| 1 | 1 | USER | ADDRESS | 2G BYTES | — | 1 | 0 |
| 2 | 2 | USER | ADDRESS | 8G BYTES | — | 0 | 0 |
| 3 | 1 | CODE | ADDRESS | 64K BYTES | — | 2 | 0 |
| 4 | 1 | BOOT | SEQUENTIAL | 1K BYTES | — | 3 | 1 |

| DIVISION NUMBER | ALL AREA | SINGLE AREA | VERSION TYPE | |
|---|---|---|---|---|
| | | | 1 | 2 |
| 1 | O | O | O | O |
| 2 | O | — | — | O |
| 3 | O | O | — | — |
| 4 | O | O | — | — |

Fig.5 PRIOR ART

PLURAL-PARTITIONED TYPE NONVOLATILE STORAGE DEVICE AND SYSTEM

TECHNICAL FIELD

The present invention relates to nonvolatile storage devices using nonvolatile memory such as flash memory. In particular, the invention relates to a plural-partitioned type nonvolatile storage device in which its storage area is partitioned into a plurality of divisions, as well as to a nonvolatile storage system having connection of a host apparatus which performs data read and write operations or the like by accessing plural-partitioned storage areas.

BACKGROUND ART

In recent years, memory cards on which flash memory as a semiconductor nonvolatile memory is mounted have been expanding their markets as a storage medium for storing user's data in digital cameras, portable telephones, cellular telephones, portable music playing devices, and the like. The flash memory, being a semiconductor device, has been increasing in memory card capacity with progress of semiconductor processes. Increases in memory card capacity together with decreases in bit cost make it possible that data which have heretofore been stored in other storage devices are stored collectively in one storage device, memory card. In particular, the memory card being smaller than hard disc drives, enables a circuit board to be mounted such that it has been demanded to be provided in forms or modes including NOR flash memories that have conventionally been used for storage of program codes, EEPROMs used for storage of boot codes, and battery-equipped SRAMs.

However, there are various problems in applications of memory cards with considerations given to such forms or modes shown above or semiconductor packages functionally equivalent to memory cards mounted on the circuit board. Those problems will be explained below with reference to FIGS. 5 to 7.

Figure 5:
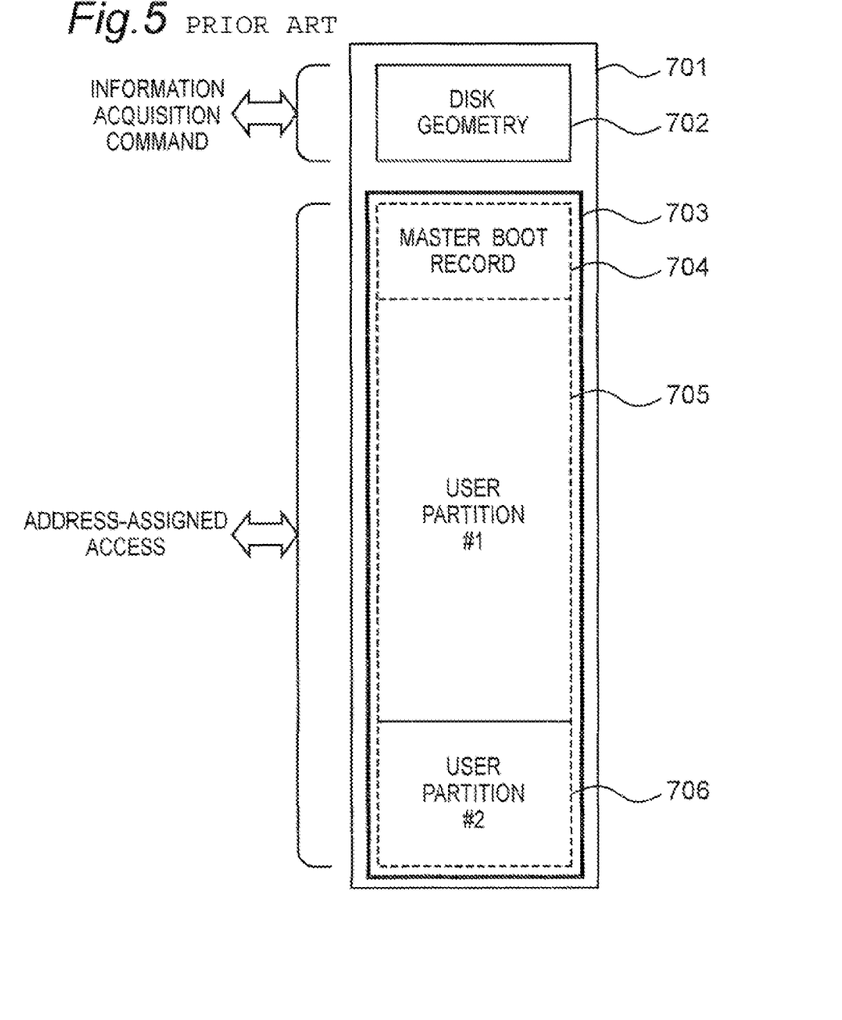
FIG. 5 is a schematic view showing an allocation state of information stored in a conventional HDD.

FIG. 5 is a schematic view showing an allocation state of information recorded in an HDD (Hard Disk Drive). Reference sign 701 denotes the HDD, 702 denotes a disk geometry storage area, and 703 denotes an HDD storage area. In the disk geometry storage area 702, is stored disk geometry which is information for calculating a capacity of the HDD storage area 703. The disk geometry, which is information related the HDD storage area 703, is information that is acquired by using an information acquisition command from outside of the HDD 701 and that is composed commonly of cylinder count, head count, sector count and the like, being information unique to the HDD 701. Therefore, the information as to the disk geometry is kept from changes and inhibited from rewriting.

The HDD storage area 703 is composed of a master boot record area (master boot sector) 704, a user partition #1 area 705, and a user partition #2 area 706. The master boot record is stored in a sector at a leading address of the HDD storage area 703. In the master boot record area 704 are stored information as to individual user partitions contained in the HDD storage area 703, i.e., address information about leading sectors of the user partition #1 and the user partition #2, and capacity information as well as format type information about the individual user partitions. It is noted here that the format type refers to information related to the file system in use.

Any information stored in the HDD storage area 703 can be accessed by address-assigned read and write operations from outside. An apparatus using the HDD 701 is enabled to correctly access each of the user partitions by reading information in the master boot record area 704 and obtaining information as to the individual user partitions in the HDD 701. Access to each user partition is enabled only by reading the information in the master boot record area 704, and does not need reading the information in the disk geometry storage area 702.

Information contained in the master boot record area 704, which is accessible from outside of the HDD 701, can be rewritten from the outside of the HDD 701. Rewriting the information in the master boot record area 704 makes it possible to change the number of partitions or capacity of each partition in the HDD storage area 703. However, it is desirable to read information stored in the disk geometry storage area 702 before rewriting the information in the master boot record area 704. HDD unique information such as total capacity of the HDD storage area 703 is useful in the rewriting of information in the master boot record area 704.

Figure 6:
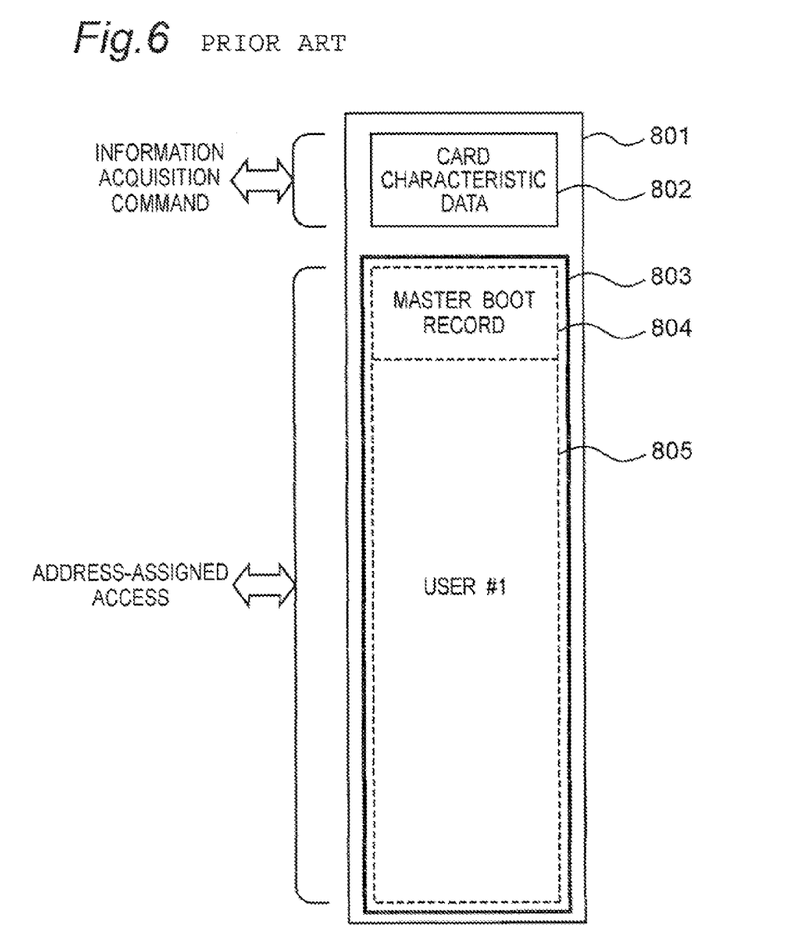
FIG. 6 is a schematic view showing an allocation state of information stored in a conventional memory card.

Next a case of memory cards is described below. FIG. 6 is a schematic view showing an allocation state of information recorded in a memory card. Reference sign 801 denotes the memory card, 802 denotes a card characteristic data storage area, and 803 denotes a memory card storage area. In the card characteristic data storage area 802 is stored card characteristic data which is information for calculating the capacity of the memory card storage area 803. This card characteristic data is information related to the memory card storage area 803, generally being information unique to the memory card 801 such as device size. The card characteristic data is acquired by using an information acquisition command from outside of the memory card 801.

The memory card storage area 803 is composed of a master boot record area 804 and a user partition #1 area 805. A master boot record is stored at a sector of a leading address of the memory card storage area 803. In the master boot record area 804 are stored information about user partition #1 contained in the memory card storage area 803, i.e. address information about the leading sector, capacity-related information, and information about format type, as to the user partition #1 area 805. It is noted here that the format type refers to information related to the file system in use.

Any information stored in the memory card storage area 803 can be accessed by address-assigned read and write operations from outside. An apparatus using the memory card 801 is enabled to correctly access the user partition #1 by reading the information in the master boot record area 804 and obtaining the information as to the user partition #1 in the area 805 within the memory card 801. Access to the user partition #1 is enabled only by reading the information in the master boot record area 804, and does not need reading the information in the card characteristic data storage area 802.

The information in the master boot record area 804, which is accessible from outside of the memory card 801, can be rewritten from the outside of the memory card 801. However, the number of partitions in the memory card storage area 803 is never changed, unlike the case of HDDs. The reason of this will be described later. In addition, it is desirable to read out the information in the card characteristic data storage area 802 before rewriting the information in the master boot record area 804. This is because information unique to the memory card such as the total capacity of the memory card storage area 803 is useful in rewriting the master boot record information.

Generally, the memory card has only one user partition, and does not include a plurality of partitions. This is due to differences the way of use between memory cards and HDDs.

HDDs, which are used primarily for personal computers (hereinafter, referred to as 'PCs') and recently used also for hard disk recorders to record broadcast programs, are under an environment of use basically free from removal. The HDD can be accessed appropriately whether it has single partition or plural partitions in the system because accessing to the HDD is performed by the single system.

However, memory cards are used in most cases as an external memory for digital cameras, portable telephones, or cellular telephones, and the way of their ordinary use is in a removably attached form in connection with many types of host apparatuses. Because of such a form of use, when a plurality of partitions are made up, such confusions as shown below can be predicted: which partition an image of a digital camera is to be stored in; under the condition that a free space is not left in a partition assigned for storage but is left in another partition, whether or not recording is done with the partition changed to one other than the assigned partition; when the memory card mixedly includes a partition whose capacity is manageable for a host apparatus and another partition whose capacity is unmanageable for the host apparatus, whether or not the manageable partition, i.e. even only part of the memory card, should be made usable.

In order to prevent occurrence of such problems as shown above, host apparatuses using memory cards are, in many cases, capable of only managing a single partition alone and, also in many cases, originally designed for a single partition alone as in PCs. As for the reason of this, when data delivery between a host apparatus, which is ready for only a single partition, and a memory card is involved, there is a problem that information recorded on the memory card by a plural-partition compatible host apparatus cannot be read out by a single-partition-only-compatible host apparatus. To avoid such problems, memory cards are generally adapted to one user partition only.

Figure 7:
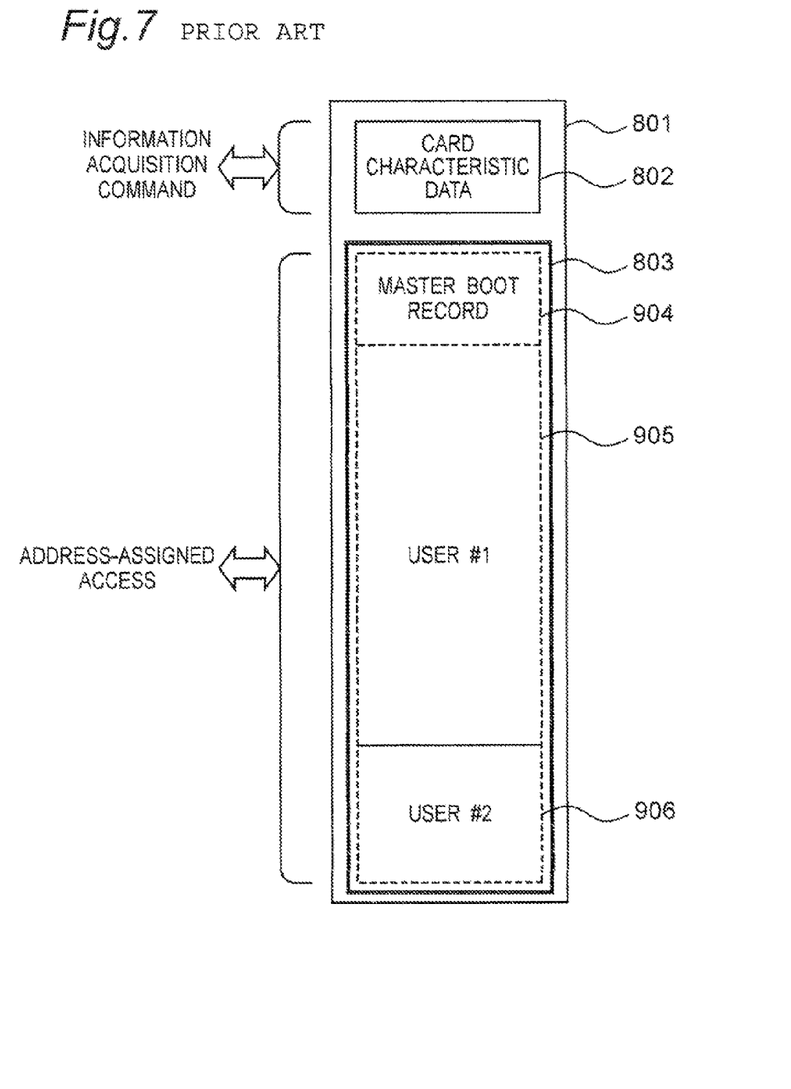
FIG. 7 is a schematic view showing an allocation state of information stored in a conventional memory card having a plurality of partitions.

FIG. 7 is a schematic view showing an allocation state of information recorded in a memory card having a plurality of partitions. In this memory card, a plurality of partitions equivalent to those of HDDs can be implemented without any technical problem. In the memory card shown in FIG. 7, information in the master boot record area 804 of the memory card of FIG. 6 is rewritten so that the memory card has information as to a plurality of user partitions. In FIG. 7, the same component elements as in FIG. 6 are designated by the same reference signs, and their description is omitted. The memory card storage area 803 is composed of a master boot record area 904, a user partition #1 area 905 and a user partition #2 area 906. A master boot record is stored at a sector of a leading address of the memory card storage area 803.

In the master boot record area 904 are stored information as to individual user partitions contained in the memory card storage area 803, i.e., address information about leading sectors of the user partition #1 and the user partition #2, and capacity information as well as format type information about the individual user partitions. It is noted here that the format type refers to information related to the file system in use.

Any information stored in the memory card storage area 803 can be accessed by address-assigned read and write operations from outside. An apparatus using the memory card 801 is enabled to correctly access each of the user partitions by reading information in the master boot record area 904 and obtaining information as to the individual user partitions in the memory card 801. Adopting such a constitution makes it possible to implement a plurality of partitions equivalent to those of HDDs.

However, such a constitution as shown above is not suitable for program codes or boot codes that are to be newly stored in the memory card. This is because reading from NOR flash memory for storage of program codes or EEPROMs for storage of boot codes conventionally does not need to read information from the master boot record area 904 to do access.

Moreover, an additional problem occurs in considering compatibility with conventional devices. Here is considered a case in which a host apparatus that operates on a precondition of one single partition performs updating of the master boot record (generally called 'formatting') in the memory card storage area 803 or reconstructing of the partition construction (generally called 'partitioning'). When the reconstructing is done based on card characteristic data of the area 802, the user partition #2 of the area 906 may be destroyed or even if the destruction does not occur, the information of user partition #2 is not registered in the master boot record area 904 because the host apparatus operates on the assumption of a single partition. This is due to an inconsistency between host apparatus' recognizable areas and card characteristic data.

These conventional arts are disclosed, for example Japanese Unexamined Patent Application Publication No. 2007-518188 and JP 2004-86505.

SUMMARY OF INVENTION

As a result of advancements in cost reduction and capacity increase of memory cards, there is a desire that program codes or boot codes, which have heretofore been stored in other storage devices, should be stored in memory cards. This necessitates an architecture in which a memory area of a memory card is divided into a plurality of partitions. Common partition dividing techniques for use in HDDs are incapable of implementing access methods required for boot codes, thus improper. That is, it is necessary to divide an area into a plurality of areas having different address spaces. However, merely dividing an area could not ensure compatibility with conventional host apparatuses incapable of recognizing a plurality of divisions. In the present-day environment in which variety of host apparatuses capable of treating memory cards are commercially available, it is of great importance to ensure the compatibility with conventional devices.

The present invention having been accomplished with a view to solving these and other issues of conventional arts as shown above, an object of the invention is to provide a plural-partitioned type nonvolatile storage device capable of dividing its storage area into a plurality of divisional areas while ensuring compatibility with conventional devices. The invention is also intended to facilitate accesses to individual areas by integrating information, which has conventionally been stored into different memories, into one memory.

In order to achieve the above objects, the present invention provides a plural-partitioned type nonvolatile storage device capable of data read and write in response to an access request derived from an external host, the plural-partitioned type nonvolatile storage device comprising a storage area which includes a device characteristic data storage area for storing plural type of device characteristic data, a division table storage area for storing a division table, and a device storage area for storing data, wherein the device storage area is divided into one or more plural partitions, the data stored in the plural partitions have an individual address and can be accessed by the address from the external host respectively, the plural-partitioned type nonvolatile storage device is configured to have different modes for adapting different accesses from the external host and to allow the external host to access partitions corresponding to the mode, the division table stored in the division table storage area has division information as to a dividing method for the plural partitions and access information as to host-accessible partitions corresponding to each individual mode, each type of device characteristic data stored in the device characteristic data storage area corresponds to each individual mode, and the plural-partitioned type nonvolatile storage device outputs the device characteristic data corresponding to the current mode to the external host in response to a command from the external host for acquiring information.

Further, also to achieve the above objects, the invention provides a storage system including: the plural-partitioned type nonvolatile storage device as described above; and a host apparatus which performs read and write operations of data stored in the plural-partitioned type nonvolatile storage device.

According to the plural-partitioned type nonvolatile storage device of the invention, it becomes possible to divide the storage area of the nonvolatile storage device into plural partitions and moreover possible for host apparatuses, whichever those host apparatuses are ready or unready for plural partitions, to fulfill formatting and partitioning processes without any problem.

DESCRIPTION OF EMBODIMENTS

Hereinbelow, an embodiment of the present invention will be described with reference to the accompanying drawings. In a plural-partitioned type nonvolatile storage device according to the invention, its storage area is divided into a plurality of partitions so that the individual divisional areas can be accessed with independent addresses, respectively. Further, the invention is intended to realize an architecture of a plural-partitioned type nonvolatile storage device free from occurrence of any problems even when used in a host apparatus that satisfies any of the following five conditions (1) to (5):

(1) a host apparatus which is ready for area division and enabled to access all of the divided areas;
(2) a host apparatus which is unready for area division and enabled to access only one area;
(3) a host apparatus which, although unready for area division, yet is enabled to access a plurality of areas as one area;
(4) a host apparatus which is ready for area division and enabled to access part of the areas; and
(5) a host apparatus which is ready for area division and reads boot codes from one area.

Figure 1:
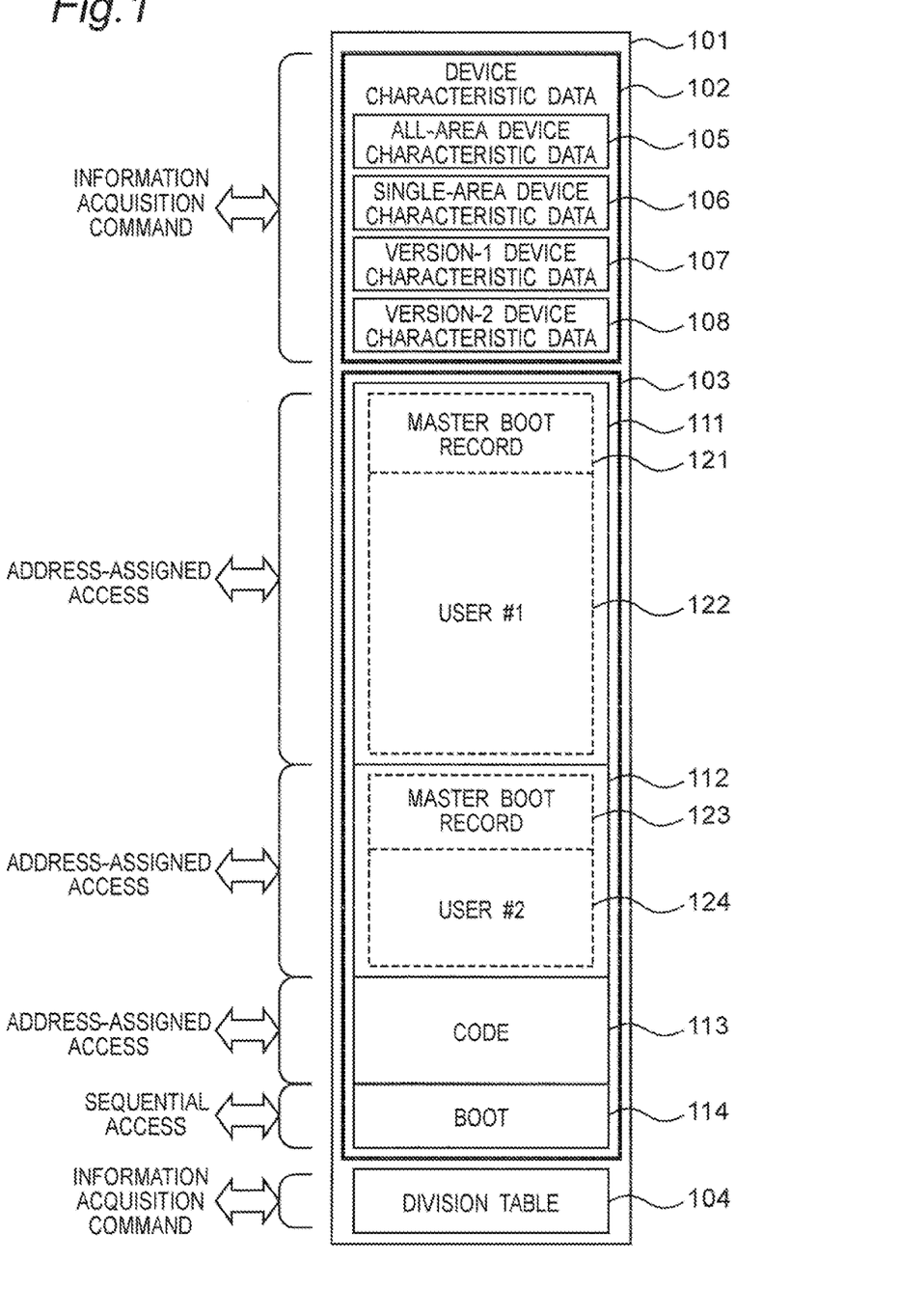
FIG. 1 is a schematic view showing an allocation state of information stored in a plural-partitioned type nonvolatile storage device according to the present invention.

FIG. 1 is a schematic view showing an allocation state of information stored in a plural-partitioned type nonvolatile storage device according to the invention. In FIG. 1, reference sign 101 denotes a plural-partitioned type nonvolatile storage device in which a nonvolatile memory is installed as an internal storage element, 102 denotes a device characteristic data storage area, 103 denotes a device storage area, and 104 denotes a division table storage area. The device characteristic data storage area 102 further includes a plurality of areas 105-108, in which stored is device characteristic data that is information related to the device storage area 103 corresponding to a plurality of modes of the plural-partitioned type nonvolatile storage device. In the division table 104, table information on an independent address interface basis for management of the way how the device storage area 103 is divided.

Out of information stored in the storage areas of the plural-partitioned type nonvolatile storage device 101, information stored in the device storage area 103 is stored in correspondence to address information. In the division table storage area 104, in correspondence to commands related to generation, deletion and attribute changes of the divisions, corresponding information inside the plural-partitioned type nonvolatile storage device 101 is stored. The device characteristic data is information which is generated in correspondence to the division table 104 by computation and control sections (not shown) inside the plural-partitioned type nonvolatile storage device 101, and which is stored in the device characteristic data storage area 102.

Reference sign 105 denotes an all-area device characteristic data storage area, 106 denotes a single-area device characteristic data storage area, 107 denotes a version-1 device characteristic data storage area, and 108, denotes a version-2 device characteristic data storage area. Device characteristic data of these plural areas 105-108 contained in the device characteristic data storage area 102 can be acquired by using an information acquisition command, which is an information-acquiring query, from outside of the plural-partitioned type nonvolatile storage device 101. In this case, however, depending on a then-current mode of the plural-partitioned type nonvolatile storage device 101, only one of the plurality of device characteristic data stored in the device characteristic data storage area 102 is acquirable.

The device storage area 103 is divided into four areas consisting of a first division area 111, a second division area 112, a code area (third division area) 113, and a boot area (fourth division area) 114. These areas are designated by using ordinal number, 'division,' 'code,' and 'boot,' but the way of designation is not particularly ruled and those names are discriminated uniquely by later-described division numbers with reference to FIGS. 2 and 4. The designation in this case conforms to the following rules (1) to (3) for an easier understanding:

(1) A 'division' is an area that can be accessed with address assignment and that has a master boot record at its leading sector, where a file system is included in the user partition with information stored on a file basis;
(2) A 'code' is an area that can be accessed with address assignment but that has no sector of any master boot record and is filled with binary data, where program codes that have conventionally been stored in NOR flash or the like are stored; and
(3) A 'boot' is an area which can be sequentially accessed from a leading address and in which binary data for starting up the system is stored, where boot codes that have conventionally been stored in EEPROMs or the like are stored.

The way of dividing the device storage area 103 shown above is an example only and the present invention is not limited to this divisional state.

The first division area 111 is composed of a master boot record area 121 and a user partition #1 area 122. The second division area 112 is composed of a master boot record area 123 and a user partition #2 area 124.

Figure 2:
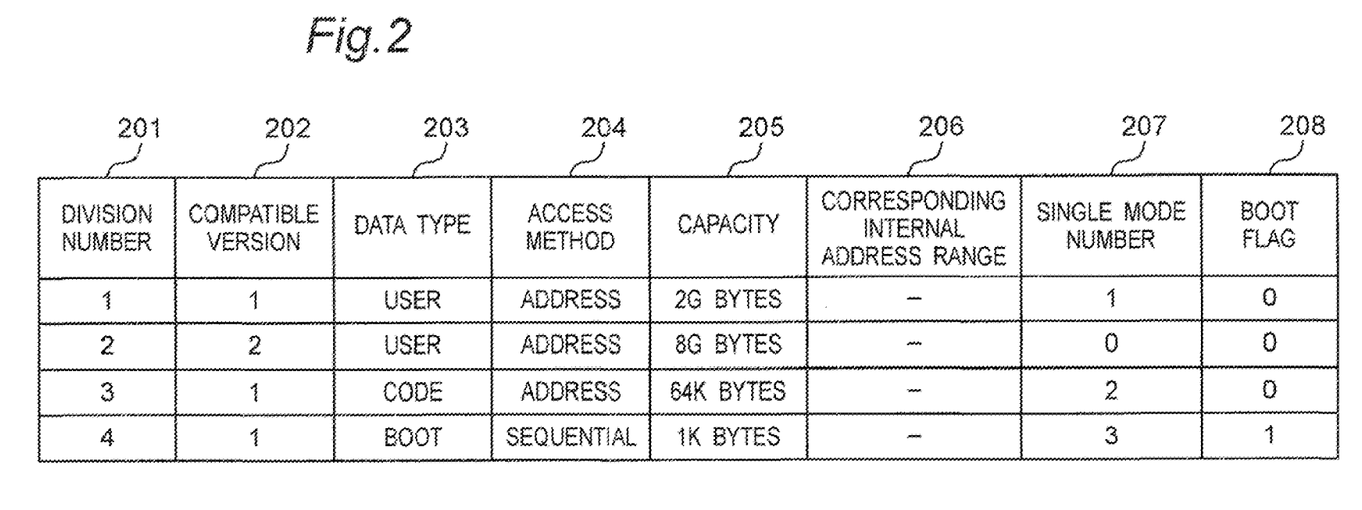
FIG. 2 is a structural view of a division table according to the invention.

FIG. 2 shows a division table stored in the division table storage area 104. Information in the division table may arbitrarily be set by an external host's issuing commands related to generation, deletion and attribute changes of the divisions. The division table has one record for each of divisions resulting from dividing the device storage area 103. Each record is composed of a division number denoted by reference sign 201, a compatible version denoted by 202, a data type denoted by 203, an access method denoted by 204, a capacity denoted by 205, a corresponding internal address range denoted by 206, a single mode number denoted by 207, and a boot flag denoted by 208.

The division number 201 is a unique value (identification number) assigned to each of the division areas in the device storage area 103. In this case, a value '1' is assigned to the first division area 111, a value '2' is assigned to the second division area 112, a value '3' is assigned to the first code area 113, and a value '4' is assigned to the first boot area 114, where unique numbers are assigned as division numbers 201 to the individual divisions, respectively. A version of the standard to which information stored in each division corresponds is stored in the compatible version 202.

In the data type 203, a data type held in each division is stored. The data type includes 'user' which corresponds to a record whose division number is 1 or 2, 'code' which corresponds to a record whose division number is 3, and 'boot' which corresponds to a record whose division number is 4. The data type 'user' is data which is stored in a division having the file system and which is accessed with address assignment. The data type 'code' is a binary code which has no file system and which is accessed with address assignment. The data type 'boot' is a binary code which is data sequentially accessed from a leading address. In the access method 204, an access method for each division is stored. The individual divisions can be accessed by their respective independent addresses.

In the capacity 205, a value of storage capacity of each division is stored. In the corresponding internal address range 206, information showing correspondence between an address uniquely assigned to all area of the device storage area 103 and each division area is stored. It is noted that information showing this correspondence is omitted in FIG. 2. In the single mode number 207, ordinal numbers of the divisions that can be accessed from outside when operating under the single division mode that ensure compatibility with conventional apparatuses, is stored. A division having "0" as a single mode number (a record having a division number of 2 in the figure) is an area that cannot be accessed under the single division mode. Under the single division node, divisions can be accessed from outside in the order of single mode numbers starting from "1" as an area that has continuous and sequential address.

In the boot flag 208, a division (corresponding to a record whose division number is 4 shown by flag '1' in the figure) that can be accessed from outside when operating under the boot mode is stored. It is noted here that the boot mode corresponds to a mode of step 304 in FIG. 3 described later.

Figure 3:
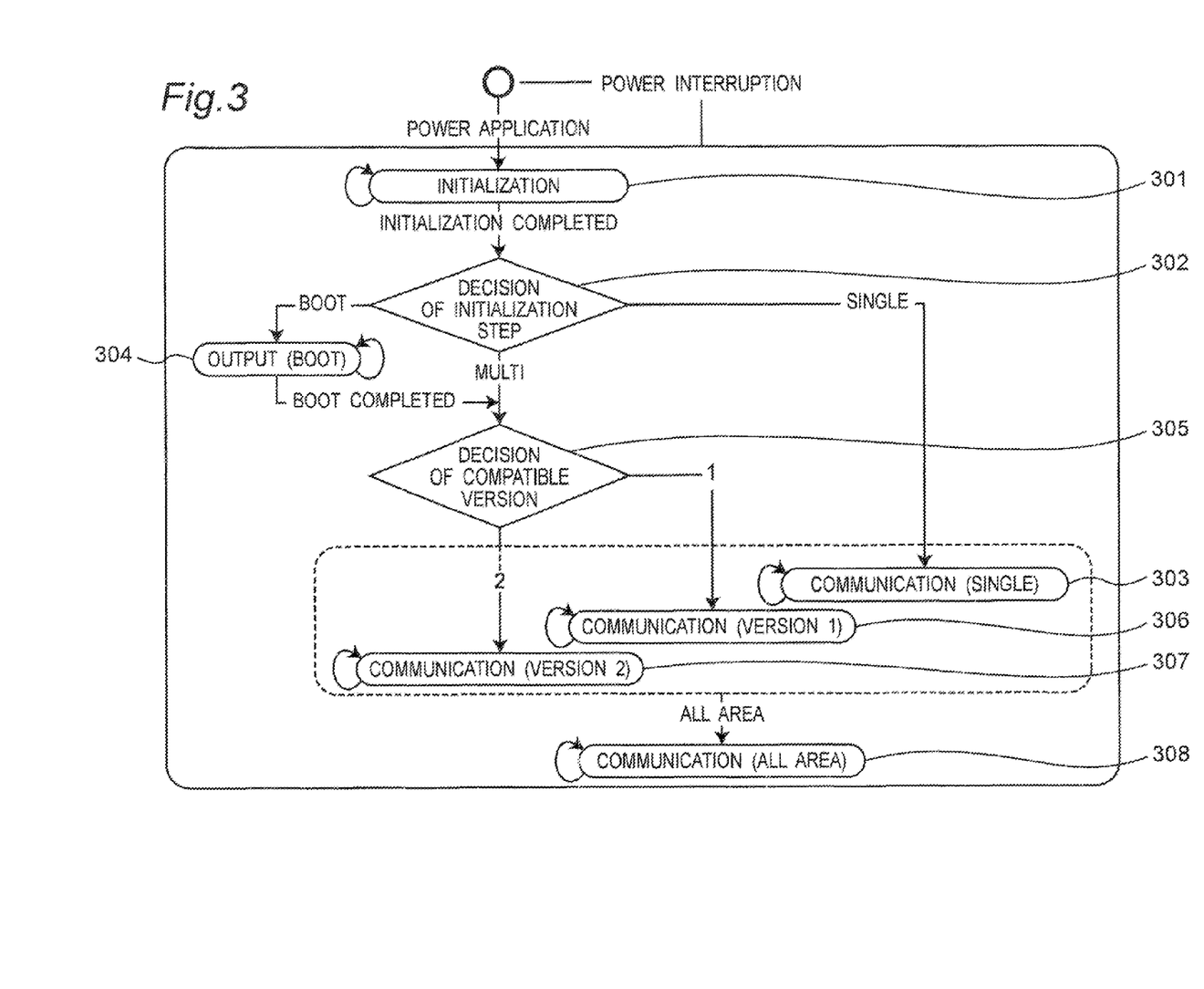
FIG. 3 is a mode transition diagram of the plural-partitioned type nonvolatile storage device of the invention.
Figure 4:
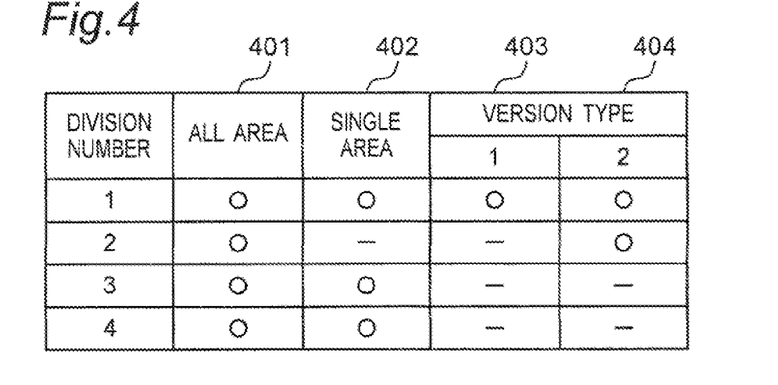
FIG. 4 is a table showing correspondence with individual divisions in determination of device characteristic data for each mode of the plural-partitioned type nonvolatile storage device according to the invention.

FIG. 3 shows a mode transition diagram of the plural-partitioned type nonvolatile storage device 101 of the invention. FIG. 4 shows correspondence with individual divisions 111-114 corresponding to the division numbers 1-4 selected in determining device characteristic data of the area 102 for each mode of the plural-partitioned type nonvolatile storage device 101. In FIG. 4, division numbers of the individual divisions are shown in the row direction, while the mode of the plural-partitioned type nonvolatile storage device 101 is shown in the column direction, where a division to be selected in each mode is circled. With reference to FIGS. 3 and 4, device characteristic data that are obtainable from outside of the plural-partitioned type nonvolatile storage device 101 are explained.

Referring to the mode transition diagram of FIG. 3, the plural-partitioned type nonvolatile storage device 101, first with source power applied thereto, goes an initialization mode of step 301. In the initialization mode 301, internal initialization process is carried out with a command received from a host apparatus outside the plural-partitioned type nonvolatile storage device 101. An external host apparatus that performs data read and write on the plural-partitioned type nonvolatile storage device 101 is enabled to initialize the plural-partitioned type nonvolatile storage device 101 into different mode depending on the sequence or argument of an initialization command issued in this case. Upon completion of the initialization, it is determined at decision step 302 what the initialization procedure has been. If the initialization procedure is a conventional initialization step incompatible with a plurality of divisions, then the plural-partitioned type nonvolatile storage device 101 goes a communication (single) node of step 303 as a single division mode.

The communication (single) mode 303 is a mode which is unready for a plurality of areas and ready for a conventional host that is enabled to access only one area. In the communication (single) mode 303, the plural-partitioned type nonvolatile storage device 101 outputs, as its device characteristic data, the device characteristic data stored in the single-area device characteristic data storage area 106 in response to an information acquisition command from an external host. In the single-area device characteristic data storage area 106, information based on the division numbers of 1, 3 and 4 selected for a single area 402 of FIG. 4 is stored. That is, as the information about the capacity of the device storage area 103, a value of (2 G+64K+1K) bytes is stored with reference to the capacity 205 shown in FIG. 2.

It is noted here that the reason why the division numbers of 1, 3 and 4 are selected in the single area 402 is that in the single mode number 207 of the division table 104, numbers other than 0 are assigned for the records whose division numbers are 1, 3 and 4 as shown in FIG. 2.

When an accessible-area number other than 1 is assigned to the single mode number 207, i.e., when a plurality of numbers other than 0 are present (i.e., two or more numbers are present) for the single mode number 207, the case is a special one in which a plurality of divisions are united so as to be treated as one division, so that a plurality of divisions having independent address spaces are united together. The host apparatus in this case is a host apparatus that satisfies the condition (3) described above, i.e., a "host apparatus which, although unready for area division, yet is enabled to access a plurality of areas as one area." The host apparatus needs to be treated in such a way that information which stored in the code area 113 and the boot area 114 and which are not controlled by the master boot record 121 is prevented from being erroneously broken. Otherwise, the information in the master boot record 121 needs to be formed in such a form that program codes of the code area 113 and boot code information in the boot area 114 are taken into consideration. By providing a constitution that allows information in the code area 113 and the boot area 114 to be accessed, it becomes possible, even for apparatuses that treat conventional non-area-divided memory cards, such as PCs, to perform read and write operations on the program codes of the code area 113 and the boot codes of the boot area 114.

In addition, in FIG. 2, in a case where one "1" is contained in the single mode number 207 (in this case, it is assumed that the single mode number 207 has a number of "1" only in the record whose division number is 1) while the single mode number 207 is "0" for all the rest of the records, only one division can be treated. In this case, from the device characteristic data storage area 102, a value of 2 G bytes, which is the capacity of the first division area 111, is obtained as a total capacity for the capacity of the device storage area 103. In this way, the host apparatus decides that the total capacity of the plural-partitioned type nonvolatile storage device 101 is 2 G bytes, to avoid breakage of the other areas in formatting or other processes. One host apparatus conforming to this case is a host apparatus that satisfies the condition (2) described above, i.e., a "host apparatus which is unready for area division and enabled to access only one area."

Information in the division table (104) can arbitrarily be set by an external host's issuing commands related to generation, deletion and attribute changes of the divisions. Therefore, changing the value of the single mode number 207 makes it possible to arbitrarily set which partition is accessible for the conventional initialization step.

At decision step 302, if it is decided that the initialization step is a boot area reading step, then the mode changes to an output (boot) mode of step 304 as a boot mode. In the output (boot) mode 304, data is outputted sequentially starting from the leading address of the record having a division number of 4 with a value of 1 stored in the boot flag 208 in the division table (104) shown in FIG. 2. Accordingly, information stored in the boot area 114 is outputted sequentially. In this case, the information acquisition command from outside of the plural-partitioned type nonvolatile storage device 101 is not permitted, so that no corresponding device characteristic data is provided. In this case, the host apparatus is a host apparatus that satisfies the condition (5) describedabove, i.e., a "host apparatus which is ready for area division and reads boot codes from one area." If data output of the first boot area 114 is terminated in the output (boot) mode 304, then a compatible version is decided at step 305.

Also, at the decision step 302, if it is decided that the initialization step is of compatibility with plural divisions and other than boot area reading, the processing moves to step 305 to make a decision as to the compatible version. In step 305, a decision is made as to the compatible standard version of an external host apparatus connected to the plural-partitioned type nonvolatile storage device 101. If the compatible standard version is "1," then the processing moves to a communication (version 1) node of step 306; on the other hand, if the compatible standard version is "2," then the processing moves to a communication (version 2) mode of step 307.

In the communication (version 1) mode 306, the plural-partitioned type nonvolatile storage device 101 outputs, as device characteristic data, the data stored in the version-1 device characteristic data storage area 107 in response to an information acquisition command from the external host. In the version-1 device characteristic data storage area 107, information based on a division (division number 1 in this case) selected by version type 1 (designated by reference sign 403) of FIG. 4 has been stored. That is, as the information as to the capacity of the device storage area 103, a value of 2 G bytes corresponding to the division number 1 has been stored with reference to the capacity 205 shown in FIG. 2. It is noted here that the reason why the division number 1 is selected for the version type 1 (403) is that in the division table 104, the record having a division number of 1 shows a value of 1 or less in the compatible version 202 and 'user' in the data type 203.

In the communication (version 2) mode 307, the plural-partitioned type nonvolatile storage device 101 outputs, as device characteristic data, the data stored in the version-2 device characteristic data storage area 108 in response to an information acquisition command from the external host. In the version-2 device characteristic data storage area 108, information based on a division (division numbers 1 and 2 in this case) selected by version type 2 (designated by reference sign 404) of FIG. 4 has been stored. That is, as the information as to the capacity of the device storage area 103, a value of (2 G+8 G) bytes has been stored with reference to the capacity 205 shown in FIG. 2. It is noted here that the reason why the division numbers 1 and 2 are selected for the version type 2 (404) is that in the division table 104, the records having division numbers of 1 and 2 show a value of 2 or less in the compatible version 202 and 'user' in the data type 203.

In the communication (version 1) mode 306 or communication (version 2) mode 307, by using a command to switch a division selected for the plural-partitioned type nonvolatile storage device 101, it becomes possible for the external host apparatus to access any arbitrary division out of the divisions selected by the device characteristic data. That is, in the communication (version 2) mode 307, any one division of the first division area 111 and the second division area 112 can be selected and accessed. However, in the example shown in this embodiment of the invention, because the division to be selected in communication (version 1) mode 306 is the first division area 111 only, there is a case where only one division is selectable even if any arbitrary division may be selected. The host apparatus in this case of the communication (version 1) mode 306 and the communication (version 2) mode 307 is a host apparatus that satisfies the condition (4) described above, i.e., a "host apparatus which is ready for area division and enabled to access part of the areas."

In the communication (single) mode 303 or communication (version 1) mode 306 or communication (version 2) mode 307, as a command for recognizing all areas is issued from the external host, then the mode of the plural-partitioned type nonvolatile storage device 101 moves to a communication (all area) mode of step 308. In this mode, the plural-partitioned type nonvolatile storage device 101 outputs, as device characteristic data, the data stored in the all-area device characteristic data storage area 105 in response to an information acquisition command from the external host. In the all-area device characteristic data storage area 105, information based on a division selected by the all area 401 of FIG. 4, i.e. information based on all the divisions, has been stored. Accordingly, as the information as to the capacity of the device storage area 103, a value of (2 G+8 G+64K+1K) bytes has been stored with reference to the capacity 205 shown in FIG. 2. The host apparatus in this case is a host apparatus that satisfies the condition (1) described above, i.e., a "host apparatus which is ready for area division and enabled to access all of the divided areas."

As shown above, in dividing the storage area of the plural-partitioned type nonvolatile storage device into a plurality of areas, device characteristic data corresponding to various mode are assumed as information for the whole device storage area 103. With such an allocation configuration adopted, a consistency between mode-dependent recognizable areas and card characteristic data can be achieved in any mode and therefore even compatibility with conventional apparatuses can also be ensured.

In the above-described embodiment, all the areas of the data storage area are assigned as effective divisions. However, in the present invention, there may be areas that are not assigned to divisions. In such a case, those divisions are managed as hidden divisions in the division table.

Also, the embodiment has been described on a method in which a plurality of device characteristic data are stored as the device characteristic data. However, it is also possible to calculate device characteristic data for each information acquisition command if device characteristic data corresponding to a mode can be outputted in response to an information acquisition command.

In addition, the storage area (memory card) of a nonvolatile storage device according to the embodiment of the invention shown in FIG. 1 has been described on a constitution having two partitions (storage areas). However, three or more partitions may also be provided, of course. In such a case, information on an each-partition basis is saved in the master boot sector. It is also possible that the storage area of a plural-partitioned type nonvolatile storage device is assumed as one partition, i.e., the storage area is used without being partitioned.

Furthermore, the nonvolatile storage device has been described as a device that is attachable to and removable from the host apparatus in this embodiment. However, the nonvolatile storage device may also be provided in a constitution in which data is transmitted and received between the host apparatus and the nonvolatile storage device via a bus.

As described hereinabove, the invention is applicable to plural-partitioned type nonvolatile storage devices including plural-partition division, and usable particularly to techniques that facilitate the handling of plural-partitioned type nonvolatile storage devices having partitions managed by the file system or partitions for storing program codes.

The invention claimed is:

1. A plural-partitioned type nonvolatile storage device capable of data read and write in response to an access request derived from an external host,
the plural-partitioned type nonvolatile storage device comprising a storage area which includes a device characteristic data storage area for storing plural type of device characteristic data, a division table storage area for storing a division table, and a device storage area for storing data, wherein
the device storage area is divided into one or more plural partitions,
the data stored in the plural partitions have an individual address and can be accessed by the address from the external host respectively,
the plural-partitioned type nonvolatile storage device is configured to have different modes for adapting different accesses from the external host and to allow the external host to access partitions corresponding to the mode,
the division table stored in the division table storage area has division information as to a dividing method for the plural partitions and access information as to host-accessible partitions corresponding to each individual mode,
each type of device characteristic data stored in the device characteristic data storage area corresponds to each individual mode, and
the plural-partitioned type nonvolatile storage device outputs the device characteristic data corresponding to the current mode to the external host in response to a command from the external host for acquiring information.

2. The plural-partitioned type nonvolatile storage device according to claim 1, wherein in a first mode, all of the plural partitions are accessible from the external host.

3. The plural-partitioned type nonvolatile storage device according to claim 1, wherein in a second mode, only one of the plural partitions is accessible from the external host.

4. The plural-partitioned type nonvolatile storage device according to claim 1, wherein the division table can arbitrarily be rewritten from the external host.

5. The plural-partitioned type nonvolatile storage device according to claim 1, wherein in a third mode, two or more and non-all partitions of the plural partitions are accessible, as one partition, with a series of addresses from the external host.

6. The plural-partitioned type nonvolatile storage device according to claim 1, wherein the plural modes are switched over by a processing sequence from the external host to the plural-partitioned type nonvolatile storage device.

7. The plural-partitioned type nonvolatile storage device according to claim 1, wherein the plural partitions include both a partition in which file system information is stored and a partition in which file system information is not contained.

8. The plural-partitioned type nonvolatile storage device according to claim 7, wherein in the partition including no file system information, programs to be used by the external host are stored.

9. The plural-partitioned type nonvolatile storage device according to claim 1, wherein a method for reading data of the individual partitions from the external host differs among the plural partitions.

10. The plural-partitioned type nonvolatile storage device according to claim 9, wherein the method for reading data includes a reading for outputting data corresponding to an address assigned from the external host, and a reading for outputting data in an address sequence starting from a leading address.

11. The plural-partitioned type nonvolatile storage device according to claim 1, wherein the plural-partitioned type nonvolatile storage device is attachable to and removable from the external host.

12. The plural-partitioned type nonvolatile storage device according to claim 1, wherein a fourth mode is a mode corresponding to version information to which the external host corresponds.

13. A nonvolatile storage system including: the plural-partitioned type nonvolatile storage device according to claim 1; and a host apparatus which is enabled to access data stored in the plural-partitioned type nonvolatile storage device.

14. The nonvolatile storage system according to claim 13, wherein the plural partitioned type nonvolatile storage device is attachable to and removable from the external host.

15. The nonvolatile storage system according to claim 13, wherein the host apparatus reads a program from the plural-partitioned type nonvolatile storage device and executes the program.

* * * * *